Jan. 8, 1946.   R. MARTIN   2,392,541
FLOOR FURNACE
Original Filed Feb. 13, 1941   2 Sheets-Sheet 1
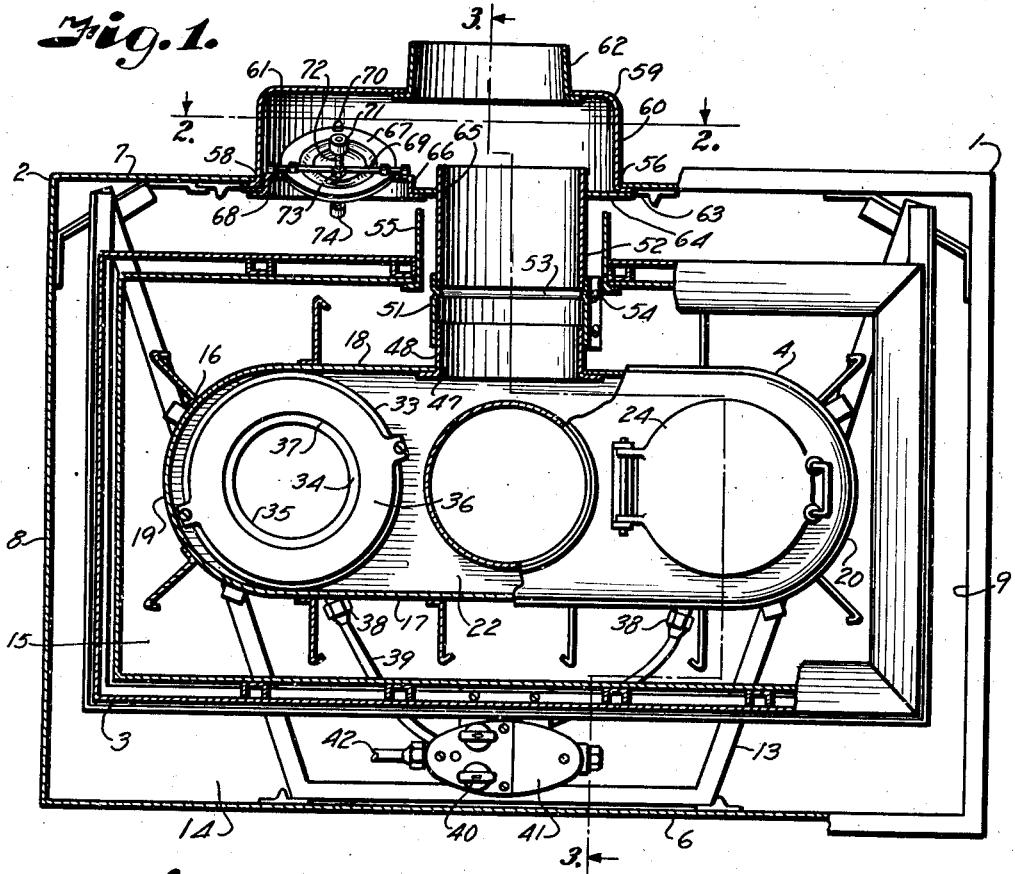
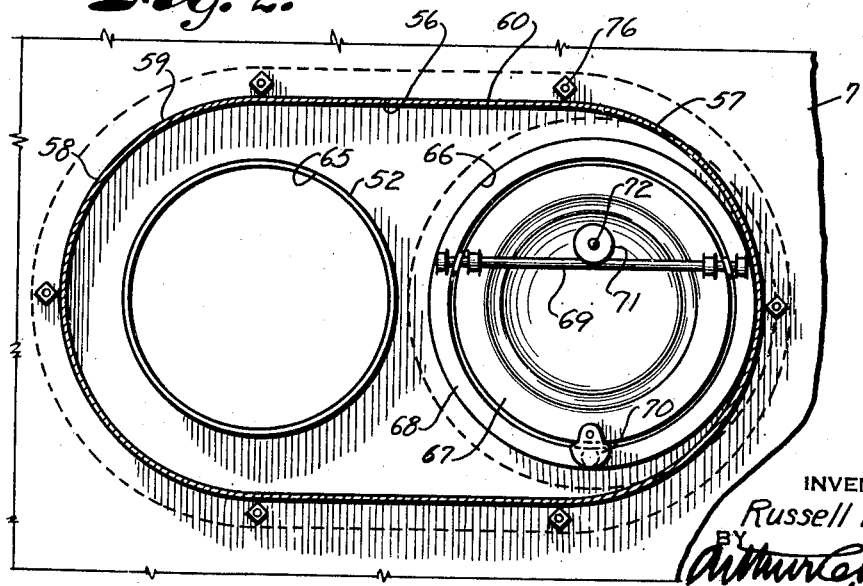
INVENTOR
Russell Martin
BY
ATTORNEY Jan. 8, 1946.  R. MARTIN  2,392,541
FLOOR FURNACE
Original Filed Feb. 13, 1941  2 Sheets-Sheet 2

INVENTOR
Russell Martin.
BY
Arthur C. Brown
ATTORNEY

Patented Jan. 8, 1946

2,392,541

UNITED STATES PATENT OFFICE 2,392,541

FLOOR FURNACE

Russell Martin, Wichita, Kans., assignor to The Coleman Lamp and Stove Company, Wichita, Kans., a corporation of Kansas Original application February 13, 1941, Serial No. 378,698. Divided and this application November 1, 1941, Serial No. 417,491

9 Claims. (Cl. 126—116)

This invention relates to draft regulators, particularly adapted for floor furnaces of the type disclosed in my copending application Serial No. 378,698, filed February 13, 1941, now Patent No. 2,324,862, dated July 20, 1943, the present application being a division thereof.

Floor furnaces are often installed in confined out-of-way places and in buildings having no basements; consequently they are preferably self-contained in an outer jacket or casing which is enclosed at the sides and bottom, usually without exterior means of access except through the top thereof. However, draft regulators are usually installed exteriorly of the furnace casing and application thereof and adjustment must be made by crawling under the floor. Therefore, principal objects of the invention are to provide a draft regulator so designed that it may be readily adjusted from the floor above the furnace while observing condition of the flame through a peephole in the top of the combustion chamber; to provide a floor furnace with a combination draft regulator and flue connection so designed that the furnace casing may be completely installed in a floor opening and the draft regulator assembled thereafter; and to provide a draft regulator which responds to difference in pressure inside the burner and the pressure in the furnace casing.

Another disadvantage in previously constructed floor furnaces is that the air supply to the draft regulator is drawn from the space under the floor. While the combustion supporting air is taken from the space heated, the air pressure in the space heated is relatively constant but the pressures under a house are not the same, especially on a windy day or if the house is built relatively tight. Therefore, another object of the invention is to provide the draft regulator and burner with air taken from the space being heated so as to provide a more accurate and sensitive control of the draft regulator. This object of the invention has the further advantage of removing air having the oxygen content reduced by breathing of the occupants of the space heated without exhausting it through a window or door. By using this air for combustion and draft regulation, it is exhausted through the chimney and the heat imparted to it in raising its temperature from the outside temperature to that of the space heated is conserved. Fresh air is then supplied to the space heated through gradual infiltration as the contaminated air is put to useful purpose and then exhausted through the chimney.

In accomplishing these and other objects of the invention, as hereinafter pointed out, I have provided improved structure, the preferred form of which is illustrated in the accompanying drawings, wherein:

Fig. 1 is a plan view of a floor furnace equipped with a combination flue connection and draft regulator embodying features of the present invention, a part of the furnace and draft regulator being shown in horizontal section.

Fig. 2 is an enlarged section through the regulator on the line 2—2 of Fig. 1.

Figure 3:
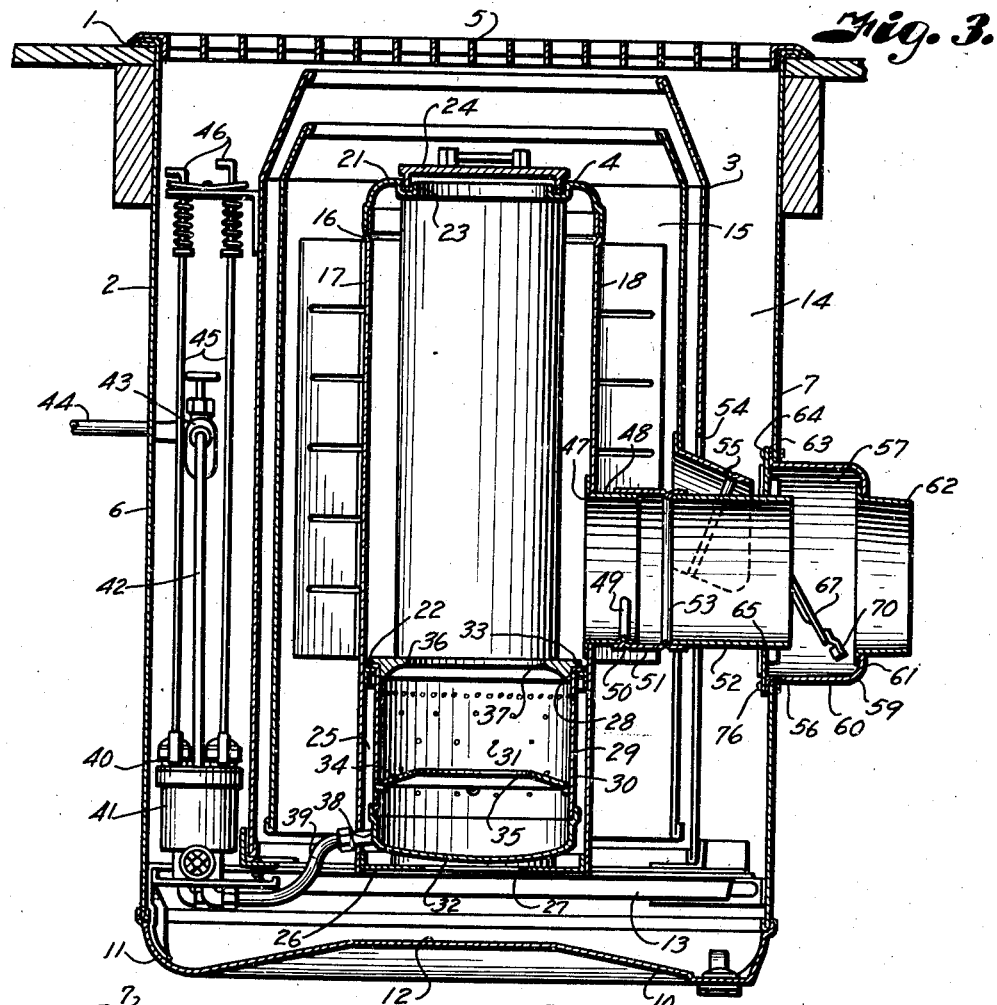
Fig. 3 is a vertical section through the furnace on the line 3—3 of Fig. 1.
Figure 4:
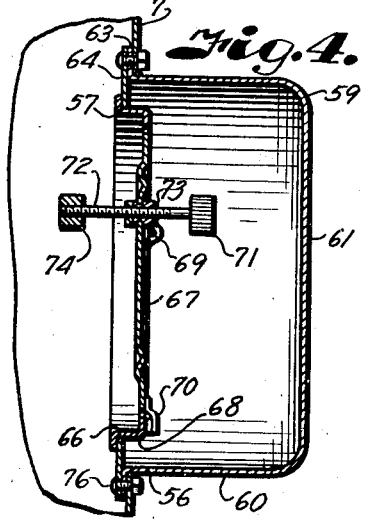
Fig. 4 is a cross-section through the draft regulator showing the damper or vane in closed position.
Figure 5:
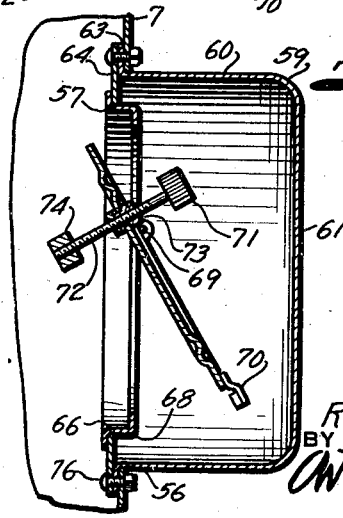
Fig. 5 is a similar view showing the damper in open position to check the draft through the fire pot of the furnace.

Referring more in detail to the drawings:

I designates a floor furnace constructed as disclosed in the above mentioned copending application and which includes an open top casing or outer jacket 2, an inner jacket 3, a burner and heating unit 4 and a floor grill 5. The casing comprises a box-like shell having sheet metal front and rear walls 6—7 connected by side walls 8—9 and a bottom 10, the marginal portion of the bottom being curved downwardly and inwardly, as indicated at 11, and then inclined upwardly to a flat central portion 12. The curvature of the bottom serves to streamline the air circulated from the room into an upwardly flowing column of air which passes over the heating unit 4 and is returned to the room through the central portion of the grill 5. Supported from the walls of the furnace casing is a frame 13, carrying the burner and heating unit 4 and the inner jacket 3 which divides the casing into a downflow passage 14 for circulating air of the space being heated and an upflow passage 15 for circulating warmed air, the upflow passage being formed between the jacket 3 and the sides of the heating unit 4.

The burner and heating unit assembly 4 includes a combustion chamber 16 formed by a metal sheet rolled to provide parallel front and rear walls 17—18 at the front and rear of the furnace and substantially semicircular end walls 19 and 20 at the sides of the furnace. The upper end of the combustion chamber is closed by a top 21 and the lower end by a bottom 22, the top being provided with one or more openings 23 which are closed by doors 24. The bottom 22 of the combustion chamber is inset within the lower portion of the combustion chamber walls a sufficient distance to form a burner or air chamber 25 therebelow and which in turn has the bottom thereof closed by a plate 26 having air inlet openings 27. Suspended within openings 28 of the bottom member 22 are burner pots 29. The burner pots 29 have walls 30 provided with air inlet openings 31 formed therein at a point spaced above the bottoms 32 of the pots. The rims of the pots are provided with lateral flanges 33 which are secured to the upper surface of the combustion chamber bottom 22.

Supported above the first series of air inlet openings is a conical shaped low flame ring 34 forming a relatively narrow flame opening 35 to control combustion of the fuel when the fuel supply is turned relatively low in providing a low heat. The open tops of the fire-pots are provided with high flame burner rings 36 having flame openings 37 communicating with the interior of the combustion chamber. The fire-pots are provided adjacent the bottoms thereof with fuel inlets 38 that are connected by tubes 39 with valves 40 positioned in and forming a part of a fuel level control and safety valve unit 41 which is supported on the frame 13 and is connected by a pipe 42 with a stop valve 43 having connection with a fuel supply line 44 extending through the side wall of the furnace so that the stop valve is located within the casing and accessible through the open top thereof.

The control valves are manipulated by stems 45 extending upwardly in one of the downflow passages and which terminate under the grill in handles 46 whereby the stems may be readily rotated to adjust the flow of fuel to the burner pots.

The rear wall 18 of the combustion chamber 16 has an opening 47 and fixed within the opening is a collar 48 having a groove 49 in one side thereof for interengaging with a rib 50 on a clamping band 51 which extends about the collar and a pipe 52, the collar being provided with an annular, inwardly extending bead 53 adapted to be engaged by the end of the pipe 52 as shown in Fig. 3. The pipe 52 extends through slots 54 in the inner jacket and across the downflow passage 14 at the rear side of the furnace. In order to divert the air moving through the downflow passage laterally across the sides of the pipe, the inner jacket carries a hood 55 straddling the pipe but spaced therefrom.

The rear wall of the casing is provided in horizontal registry with the pipe 51 with an elongated opening 56 to accommodate a draft regulator assembly 57 which constitutes the present invention. The opening preferably has semicircular ends 58 and conforms in shape to the regulator assembly which projects therethrough from the inner side of the casing.

The draft regulator assembly includes a substantially pan-shaped, elongated body 59, having a side wall 60 projecting through the opening 56 and having a back wall 61 carrying a flue collar 62 in substantially coaxial alignment with the pipe 52 as shown in Fig. 1. The front of the regulator has a marginal flange 63, and fixed thereto is a plate 64 having an opening 65 in registry with the collar 48 so that the pipe 52 is readily slidable therein to connect the collar 48 with the draft regulator and form an outlet to a vent pipe (not shown) which is connected with the collar 62. Located in the opposite end of the plate is an opening 66, the effective area of which is controlled by a damper or vane 67. The damper 67 is carried in a frame 68 inset within the opening 66. The damper or regulator vane is trunnioned on a rod 69 at a point above its horizontal diameter so that it is out of balance and will swing outwardly at the bottom thereof. The regulator vane has a stop 70 for engaging the frame when it is normally urged to closed position by a weight 71 carried on an adjusting screw 72. The adjusting screw is rotatable within an internally threaded insert 73 which is provided in the vane at a point above the trunnioning axis thereof. The inner end of the adjusting screw, or that projecting into the downflow passageway of the furnace, carries a knob 74 and carried on the opposite end is the weight 71. By turning the knob the weight is adjusted with respect to the regulator vane so that the regulator vane automatically opens with response to a predetermined chimney draft for controlling the draft on the heater and burner unit. The draft regulator or damper is thus responsive to differential in pressure within the vent pipes and the air pressure within the furnace casing. The draft on the burner is thereby controlled in that the burner takes air for combustion from within the casing.

When the furnace is to be installed, an opening is made in the floor of the building of slightly larger dimensions than the furnace casing and the floor joists are connected by suitable headers as in conventional practice. The vent pipe connection is then made from a chimney to the point of connection with the furnace and the fuel supply line 44 is installed. The furnace casing, with the draft regulator assembly removed, is passed through the floor opening so that it is supported by the flanges provided thereon. The draft regulator assembly 57 is then passed through the open top of the casing and pushed into the opening 56 so that the pan-shaped body thereof projects from the outer side of the casing. The vent pipe (not shown) is attached to the collar 62 and suitable fastening devices 76 are projected through openings in the flange 63 and through registering openings in the rear wall of the casing to retain the draft regulator assembly rigid. The fuel supply line 44 is projected through a suitable opening in the side wall of the casing and connected with the stop valve 43. This completes the outer connections to be made with the furnace.

The pipe 52 carrying the loosened clamping band 51 is pushed back into the opening 65. The heating and burner unit assembly 4, carrying the supporting frame 13 and fuel control and safety valve 41, is passed through the open top of the casing and lowered thereinto until the frame rests on its supports within the casing. The fuel control and safety valve unit may then be adjusted to level position as disclosed in the above mentioned application and the pipe 42 leading thereto is connected with the stop valve 43. The pipe 52 carrying the clamping band 51 is withdrawn from the opening of the draft regulator so that the band slides over the collar 48, after which the band is tightened to draw the rib 50 into engagement with the groove 49 to prevent retractive movement of the pipe 52. The inner jacket 3 carrying the valve stems 45 is moved into position through the open top of the casing so that it surrounds the burner and heating unit. The valve stems are then connected with the control valves. Fuel is turned on to the respective fire-pots and lighted through the door openings 23 in the top of the combustion chamber. As the fire-pots heat up, the fuel control valve may be gradually opened to full setting. The draft regulator is then adjusted to obtain the desired flame color by manipulating the knob 14 from above the floor by reaching the downdraft passageway. The flame color may be noted through suitable peep openings in the top of the combustion chamber. The grill 5 is then applied over the open top of the furnace casing, completing the installation.

In operation, combustion supporting air is drawn from the furnace casing through the openings 27 into the air or burner chamber 25 and thence through the restricted openings 31 of the burner pots responsive to differential between the pressure in the combustion chamber and that in the furnace casing. The resulting products of combustion rise from the fire-pots and travel upwardly through the combustion chamber and then downwardly to pass out through the flue connection. As the combustion chamber walls are heated air circulation occurs through the floor grill, the hot air rising in the space around the combustion chamber and discharging through the central portion of the grill, which air is replaced by cooler air passing downwardly through the marginal portions of the grill and through the downflow passageway 14 under the lower edge of the inner jacket, and then upwardly in heat exchange relation with the heating surfaces of the combustion chamber.

Since the draft control air admitted to the draft regulator and the combustion supporting air are both taken from the furnace casing, the proper pressure differential between the inside and outside of the burner is readily maintained in accordance with adjustment of the regulator vane or damper.

What I claim and desire to secure by Letters Patent is:

1. A floor furnace including an open top casing having side walls and a closed bottom, an inner jacket having walls spaced from the side walls of the casing and from said bottom to form a downflow circulating passage therebetween, a heater assembly positioned within planes defined between walls of the inner jacket, a draft regulator mounted in a side wall of the open top casing and having a venting means, a flue connection for the heater assembly, said draft regulator including a housing defining a chamber in communication with the venting means and said flue connection to form a continuous passageway therebetween and having an air inlet opening from said downflow passage communicating with said chamber, a draft regulating damper, means supporting said damper for movement in said inlet opening, and adjustable weight means on the damper accessible through said passage from the open top of the casing whereby the action of the damper is manually adjusted to obtain a required pressure differential between the interior and exterior of the heater assembly.

2. A furnace of the character described including, an open top casing having side walls and a closed bottom, an inner jacket having walls spaced from the side walls of the casing and from said bottom to form a downflow circulating air passage therebetween, a heater assembly positioned substantially within the inner jacket and having an air inlet and a flue outlet, a draft regulator directly connected with the flue outlet of the heater assembly, said draft regulator including a housing defining a chamber in communication with the flue outlet and adapted to be connected with a venting means to form a continuous passage therebetween and having an air inlet in connection with the downflow air circulating passage to admit air from the passage into the chamber when connected with said venting means, and a damper in said air inlet of the regulator movable responsive to differential of pressures acting thereon from the air circulating passage and said chamber for substantially maintaining a predetermined differential pressure of the circulating air within the downflow passage and the gases within the heater assembly.

3. A furnace of the character described including, an open top casing having side walls and a closed bottom, an inner jacket within the casing having walls spaced from walls of the casing and said bottom to form an air passage therebetween, a burner and combustion chamber positioned in the furnace for heating air within the inner jacket, a draft regulator assembly including a housing defining a chamber connecting the burner and combustion chamber assembly to a venting means, forming a continuous passage therebetween, said casing wall forming the air passage having an opening to receive said housing, said regulator assembly being bodily positioned exteriorly of the casing, said housing having a front wall closing said opening in the casing and provided with an air inlet in connection with the downflow air passage and said chamber, a damper in said inlet in said housing wall, adjusting means on the damper accessible through the open top of the casing by way of said downflow passage for affecting the position of said damper responsive to pressures acting on the respective sides thereof for controlling inflow of air from the downflow passage to the regulator, and means connected with downflow passage for supplying combustion supporting air to the burner.

4. A furnace of the character described including an open top casing having side walls and a closed bottom, an inner jacket within the casing having walls spaced from walls of the casing and said bottom to form a downflow air passage therebetween, a burner and combustion chamber assembly positioned substantially within the inner jacket, a draft regulator assembly having air flow connection with the downflow air passage and the combustion chamber, said draft regulator assembly having venting means and including a housing defining a chamber with which both the flue and the venting means communicate to form a continuous passage and said air flow connection having communication with said chamber, a damper in said air flow connection for passing air from the downflow passage into the regulator assembly to provide a regulating draft through the combustion chamber, and means connected with the downflow passage for supplying combustion supporting air to the burner from said air passage.

5. A furnace including, an open top casing adapted for insertion through a floor opening and having side walls and a closed bottom, a burner and combustion chamber assembly supported in the casing, an inner jacket in the casing and cooperating with the walls of the casing and said burner and combustion chamber assembly to form downflow and upflow passages for the circulation of air to be heated, one of said casing walls having an opening therein, a combination draft regulator and flue connection supported by the casing and insertable in said opening from within said downflow passage, means removably securing said draft regulator to the casing, said draft regulator being arranged to project outwardly from said wall and having an air inlet from the downflow passage, a vent outlet and a connection with said combustion chamber, a vane controlling said air inlet responsive to differential of pressure in the downflow passage and the gases vented from the combustion chamber, and means for adjusting action of the vane to effect the desired differential of pressure, said adjusting means being accessible through the downflow passage from the open top of the casing.

6. A furnace of the character described including an outer casing, a burner and combustion chamber assembly supported in the casing, means supplying the burner with combustion supporting air from said casing, a combination draft regulator and flue connection including a housing substantially completely disposed exteriorly of the outer casing and defining a chamber and having an air inlet to the interior of said casing and having a flue outlet, duct means connecting the burner and combustion chamber assembly with said flue outlet through said chamber, and a vane pivotally mounted in said air inlet and having one side subject to pressures in the casing and the other side to pressures within said flue connections whereby the vane is movable responsive to the differential in said air pressures to vary the effective opening of the air inlet.

7. A furnace of the character described including, an outer casing, a burner and combustion chamber assembly supported in the casing, means supplying the burner with combustion supporting air from said casing, a combination draft regulator and flue connection including a housing substantially completely disposed exteriorly of the outer casing and defining a chamber and having an air inlet to the interior of said casing and having a flue outlet, duct means connecting the burner and combustion chamber assembly with said flue outlet through said chamber, a vane pivotally mounted in said air inlet and having one side subject to pressures in the casing and the other side to pressures within said flue connections whereby the vane is movable responsive to the differential in said pressures, and adjustable means on the vane accessible from the top of the casing for varying the pressure at which the vane is adapted to open.

8. A furnace of the character described including, an outer casing having an opening in a side wall thereof and draft regulator assembly substantially completely disposed exteriorly of the casing and including a housing insertable through said opening from the interior of the casing and having an air inlet in connection with the interior of the casing, a flue connection for said housing, a heater unit in the casing including a combustion chamber, means connecting the combustion chamber with the housing, said housing defining a chamber forming a continuous passageway between said duct means and the flue connection, a vane pivoted in said inlet of the housing to control air admitted to the chamber from said casing, said vane being pivotally positioned to have one side subject to air pressure in the casing and another side subject to pressure within the chamber, and a weight adjustably positioned on one side of said vane and arranged to be manipulated from the top of the casing to vary the effect which the air pressure has upon the vane for controlling differential between said pressures.

9. A furnace of the character described including, an open top outer casing having an opening in a side wall thereof, a draft regulator assembly substantially completely disposed exteriorly of the casing and including a housing insertable through said opening from the interior of the casing and having an air inlet connection with the interior of the casing, a flue connection for said housing, a heater unit in the casing including a combustion chamber, means connecting the combustion chamber with the housing, said housing defining a chamber forming a continuous passageway between said duct means and the flue connection, and a vane pivoted in said inlet of the housing to control air admitted to the chamber from said casing and having one side subject to air pressure in said outer casing and the other side subject to pressure within the chamber for maintaining a predetermined pressure differential between said pressures.

RUSSELL MARTIN.